United States Patent
Suarez Fuentes et al.

(10) Patent No.: US 9,191,468 B2
(45) Date of Patent: Nov. 17, 2015

(54) TRAFFIC CLASSIFICATION

(75) Inventors: David Suarez Fuentes, Madrid (ES); Jesus-Javier Arauz-Rosado, Madrid (ES); Alberto Casado Martin, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 300 days.

(21) Appl. No.: 13/702,807

(22) PCT Filed: Jun. 9, 2010

(86) PCT No.: PCT/EP2010/058090
§ 371 (c)(1),
(2), (4) Date: Dec. 7, 2012

(87) PCT Pub. No.: WO2011/154038
PCT Pub. Date: Dec. 15, 2011

(65) Prior Publication Data
US 2013/0083806 A1     Apr. 4, 2013

(51) Int. Cl.
*H04L 29/06* (2006.01)
*H04L 12/24* (2006.01)
*H04L 29/08* (2006.01)

(52) U.S. Cl.
CPC ............ *H04L 69/22* (2013.01); *H04L 41/0893* (2013.01); *H04L 67/22* (2013.01); *H04L 67/306* (2013.01)

(58) Field of Classification Search
CPC ... H04L 1/0893; H04L 69/22; H04L 41/0893; H04L 67/22; H04L 67/306
USPC .................. 370/230, 232, 233, 234, 238, 252
See application file for complete search history.

(56) References Cited

U.S. PATENT DOCUMENTS

| 7,664,048 | B1 | 2/2010 | Yung et al. |
| 2009/0295594 | A1* | 12/2009 | Yoon ........................ 340/825.36 |
| 2010/0169343 | A1* | 7/2010 | Kenedy et al. ................ 707/758 |
| 2011/0239273 | A1* | 9/2011 | Yang et al. ........................ 726/3 |

OTHER PUBLICATIONS

International Search Report for PCT/EP2010/058090 mailed Mar. 7, 2011.
L. Bernaille et al., "Traffic Classification on the Fly", ACM SIGCOMM Computer Communication Review, vol. 36, No. 2, Apr. 30, 2006, pp. 23-26.

(Continued)

*Primary Examiner* — Christopher Grey
(74) *Attorney, Agent, or Firm* — Baker Botts, LLP

(57) ABSTRACT

According to a first aspect of the present invention there is provided an apparatus configured to classifying user traffic flows carried by a network, each user traffic flow being associated with one of a plurality of users. The apparatus comprises a classification unit 7 for classifying each user traffic flow into one of a plurality of traffic classes, a pattern generation unit 13 for generating a user pattern for each user, a grouping unit 14 for grouping the plurality of users into one or more user groups, and for identifying a user pattern within each user group that is representative of all user patterns within the user group, and an optimized classification unit 8 for identifying a user associated with a subsequent user traffic flow, determining the user group to which the user belongs, retrieving the representative user pattern of said user group, and using the traffic classes included in the representative user pattern to classify the subsequent user traffic flow.

20 Claims, 3 Drawing Sheets

(56) References Cited

OTHER PUBLICATIONS

T. Nguyen et al., "A Survey of Techniques for Internet Traffic Classification Using Machine Learning", IEEE Communications Surveys, IEEE, vol. 10, No. 4, Oct. 1, 2008, pp. 56-76.

Thiago de Barros Lacerda, On the Optimization of Deep Packet Inspection, Federal University of Pemambuco Graduation in Computer Science, Informatics Center 2008.2, Recife, Aug. 26, 2008, 7 pages.

The Perils of Deep Packet Inspection, Symantec Connect, Created Jan. 10, 2005, Updated Oct. 19, 2010, 3 pages, downloaded Nov. 12, 2014.

Ralf Bendrath, Global Technology Trends and National Regulation: Explaining Variation in the Governance of Deep Packet Inspection, Intl. Studies Annual Convention, New York City, Feb. 15-18, 2009, 32 pages.

Tarari Content Processors: Products: Networking: LSI, Internet Archive Waybackmachine, 2 pages, downloaded Jan. 6, 2015.

\* cited by examiner

TRAFFIC CLASSIFICATION

This application is the U.S. national phase of International Application No. PCT/EP2010/058090 filed 9 Jun. 2010 which designated the U.S., the entire contents of which is hereby incorporated by reference.

TECHNICAL FIELD

The present invention relates to traffic classification, and, more particularly, to methods and apparatus for optimising the classification of user traffic flows.

BACKGROUND

A packet is a formatted unit of data carried by a packet switched network. When data has to be transmitted, it is broken down into segments and formatted into packets for transmission over the network. When the packets reach their destination the segments of data encapsulated within the packets can be retrieved and reassembled into the original data. The exact format of the packets depends upon the protocol used by the network. However, a packet typically has a header and a payload. The header usually contains information required to route the packet to its intended destination, and possibly information identifying the source of the packet. The payload or content of the packet contains the data segment carried by the packet. A packet flow or traffic flow is a sequence of packets sent from a particular source to a particular destination.

Packet filtering involves parsing a packet header, and applying a pre-defined set of rules to the information contained within the header in an attempt to classify the type of network traffic to which the packet belongs. Traditionally, packet filtering has been used by firewalls to prevent unauthorized access to or from a particular network or computer, whilst permitting authorized communications. However, packet filters are stateless, as they examine packets on an individual basis and have no memory of previous packets, which makes them vulnerable to spoofing attacks. Spoofing involves an attacker gaining unauthorized access to a computer or network by making it appear that a malicious message has come from a trusted machine by faking the address of that machine in the packet header.

As an advance on packet filtering, stateful packet inspection can be used to determine which network packets to allow through the firewall. Stateful packet inspection involves examining packet headers and remembering something about them. This information can then be used when processing later packets. For example, both incoming and outgoing packets can be examined over a period of time and outgoing packets that request specific types of incoming packets are tracked, with only those incoming packets constituting a proper response to an outgoing packet being allowed through the firewall.

Packet filtering and stateful packet inspection are known as Shallow Packet Inspection (SPI) techniques, as they rely solely on the information contained in the header of the packets to determine how a packet should be dealt with. For example, in an IP network, SPI involves inspecting IP packets up to layer 4 (TCP/UDP layer) of the OSI model, typically extracting a "5-tuple" consisting of the source IP address, destination IP address, source transport layer address (e.g. TCP/UDP port), destination transport layer address (e.g. TCP/UDP port), and the next level protocol used in the data portion of packet (e.g. TCP, UDP, ICMP etc). However, by only examining the information contained with the packet headers, these SPI techniques have their limitations.

In order to overcome some of the shortcomings of SPI, Deep Packet Inspection (DPI) involves looking beyond the header information, and inspecting the content or payload of packets, up to layer 7 of the OSI model. This thorough analysis of packets can be used for a variety of purposes, including, among others, network security, network management, traffic profiling and statistics collection, copyright enforcement, content regulation, and surveillance.

A DPI system analyzes the header and payload of packets flowing through it, and applies a set of packet classification rules or criterion to the information in the header and payload of packets in an attempt to identify the class of traffic and user session to which a traffic flow belongs. For example, a DPI system will parse the packets in a flow to determine the type of protocols (HTTP, SMTP, etc) that the packets relate to, the metrics of the packets (size, ports, etc), the packet or octet transfer rates, and the sequence(s) of exchanged packets etc. A DPI system will then apply the packet classification rules to all of this information in an attempt to determine the class of traffic. These packet classification rules can make use a variety of techniques such as port analysis, string matching, statistical analysis, heuristic analysis, protocol header analysis, packet payload analysis etc. As such, systems that implement DPI are required to thoroughly analyse packets in real-time and, in general, will be required to analyse at least a minimum number of packets at the beginning of almost every traffic flow sent and/or received by a user. DPI systems are therefore required to be capable of providing a significant amount of computing power.

Due to the highly demanding task performed by DPI systems when used to perform packet classification, and to the ever increasing amount of network traffic, the amount of data to be analyzed by DPI systems has reached a point at which optimisation mechanisms are mandatory. Currently, optimisation for DPI systems is achieved using either horizontal or vertical scaling. Horizontal scaling makes use of an increasing number of machines to perform the DPI analysis in parallel, whereas vertical scaling involves delegating individual steps of the DPI analysis to specialised hardware. However, both increasing the number of machines and the use of specialized hardware can be expensive such that it may well be unfeasible, from a business perspective, to acquire and maintain the systems required to perform DPI. For example, DPI is likely to be unfeasible for the traffic flows generated by or for the users of a flat-fee mobile broadband service.

In addition, both horizontal scaling and vertical scaling are only capable of achieving a linear increase in performance. For example, in order to double the rate at which a DPI system can classify traffic flows, the system would require double the number of machines, or double the amount of resources. Given that all forecasts of Internet traffic, both mobile and fixed, predict an exponential increase in the amount of traffic consumed by users, this linear increase in DPI throughput will not be sufficient, at a reasonable cost, to keep up with the traffic that will have to be analyzed. It is therefore desirable to provide a mechanism for optimising the traffic classification performance of DPI systems to sufficiently increase their throughput at a minimal cost.

SUMMARY

It is an object of the present invention to provide a mechanism optimising the classification of user traffic flows.

According to a first aspect of the present invention there is provided an apparatus configured to classifying user traffic flows carried by a network, each user traffic flow being associated with one of a plurality of users. The apparatus comprises a classification unit for classifying each user traffic flow into one of a plurality of traffic classes, a pattern generation unit for generating a user pattern for each user, each user pattern comprising the traffic class of each user traffic flow associated with said user, a grouping unit for grouping the plurality of users into one or more user groups based on the user pattern associated with each user, and for identifying a user pattern within each user group that is representative of all user patterns within the user group, and an optimised classification unit for identifying a user associated with a subsequent user traffic flow, determining the user group to which the user belongs, retrieving the representative user pattern of said user group, and using the traffic classes included in the representative user pattern to classify the subsequent user traffic flow.

This optimised traffic classification procedure can reduce the processing required to classify each new user traffic flow, increasing the efficiency of the traffic classification processing without the need for significant additional hardware or processing resources.

The apparatus may further comprise a memory storing one or more traffic criterion for each of the plurality of traffic classes, the one or more traffic criterion of a traffic class being configured to determine if a user traffic flow belongs to said traffic class, each traffic criterion defining a characteristic of a user traffic flow and a value for said characteristic.

The classification unit may be configured to obtain, from each user traffic flow, a value for the characteristic defined by each of the one or more traffic criterion of the plurality of traffic classes, determine a traffic class for which the value of the characteristic defined in each of the one or more traffic criterion of said traffic class matches the obtained value for said characteristic, and classify the user traffic flow into said traffic class.

The optimised classification unit may be configured to obtain, from the subsequent user traffic flow, a value for the characteristic defined by each of the one or more traffic criterion of those traffic classes included in the representative user pattern, attempt to identify a traffic class, from amongst those traffic classes included in the representative user pattern, for which the value of the characteristic defined in each of the one or more traffic criterion of said traffic class matches the obtained value for said characteristic, and, if a traffic class is identified, classify the subsequent user traffic flow into said traffic class, and update the user pattern of the user accordingly.

If a traffic class can not be identified from amongst those traffic classes included in the representative user pattern, then the optimised classification unit may be further configured to not classify the subsequent user traffic flow. Alternatively, if a traffic class can not be identified from amongst those traffic classes included in the representative user pattern, then the optimised classification unit may be further configured to obtain, from each user traffic flow, a value for the characteristic defined by each of the one or more traffic criterion of the plurality of traffic classes, determine a traffic class for which the value of the characteristic defined in each of the one or more traffic criterion of said traffic class matches the obtained value for said characteristic, and classify the user traffic flow into said traffic class.

The apparatus may further comprise a transceiver for obtaining the additional user-related information from one or more entities within or attached to the network.

The pattern generation unit may be configured to generate a user pattern for each user that further comprises additional user-related information.

The grouping unit may be configured to group the plurality of users into one or more user groups and to identify the representative user pattern of each user group using a clustering algorithm. The grouping unit may also be configured to use a k-means algorithm as the clustering algorithm, and to identify the representative user pattern of a user group as a centroid of the user group as determined by the k-means algorithm. The grouping unit may be configured to only group the plurality of users into one or more user groups once a pre-defined learning period has expired and/or once a pre-defined minimum number of user patterns have been generated by the pattern generation unit.

According to a second aspect of the present invention there is provided a method of classifying user traffic flows carried by a network, each user traffic flow being associated with one of a plurality of users. The method comprises:
classifying each user traffic flow into one of a plurality of traffic classes,
for each user, generating a user pattern comprising the traffic class of each user traffic flow associated with said user;
grouping the plurality of users into one or more user groups based on the user pattern associated with each user;
for each user group, identifying a user pattern that is representative of all user patterns within the user group; and
for each subsequent user traffic flow, identifying a user associated with the subsequent user traffic flow, determining the user group to which the user belongs, retrieving the representative user pattern of said user group, and using the traffic classes included in the representative user pattern to classify the subsequent user traffic flow.

The method may further comprise, for each traffic class, configuring one or more traffic criterion to be used to determine if a user traffic flow belongs to said traffic class, each traffic criterion defining a characteristic of a user traffic flow and a value for said characteristic. The characteristics of a traffic flow may comprise information obtained from packets that constitute the traffic flow. This information may comprise any of:
source address;
destination address;
protocol;
protocol headers;
protocol states;
protocol parameters; and
Quality of Service, QoS, parameters.

The step of classifying each user traffic flow into one of a plurality of traffic classes may comprise:
obtaining, from each user traffic flow, a value for the characteristic defined by each of the one or more traffic criterion of the plurality of traffic classes;
determining a traffic class for which the value of the characteristic defined in each of the one or more traffic criterion of said traffic class matches the obtained value for said characteristic; and
classifying the user traffic flow into said traffic class.

The step of using the traffic classes included in the representative user pattern to classify the subsequent user traffic flow may comprise:
obtaining, from the subsequent user traffic flow, a value for the characteristic defined by each of the one or more traffic criterion of the traffic classes included in the representative user pattern;

attempting to identify a traffic class, from amongst those traffic classes included in the representative user pattern, for which the value of the characteristic defined in each of the one or more traffic criterion of said traffic class matches the obtained value for said characteristic; and if a traffic class is identified, classifying the subsequent user traffic flow into said traffic class, and update the user pattern of the user accordingly.

If a traffic class can not be identified from amongst those traffic classes included in the representative user pattern, then the subsequent user traffic flow may not be classified. Alternatively, if a traffic class can not be identified from amongst those traffic classes included in the representative user pattern, then the method may further comprises:

obtaining, from each user traffic flow, a value for the characteristic defined by each of the one or more traffic criterion of the plurality of traffic classes;

determining a traffic class for which the value of the characteristic defined in each of the one or more traffic criterion of said traffic class matches the obtained value for said characteristic; and classifying the user traffic flow into said traffic class.

The user pattern generated for each user may further comprise additional user-related information. The step of generating a user pattern for each user may then further comprise a step of obtaining the additional user-related information from one or more entities within or attached to the network. This additional user-related information can comprise any of:

one or more addresses of resources accessed by the user;
the type of device that the user is using to access the network; and
a profile containing user subscription information.

The plurality of users may be grouped into one or more groups and the representative user pattern of each group identified using a clustering algorithm. The clustering algorithm may be a k-means algorithm, and the representative user pattern of a user group identified as a centroid of the user group as determined by the k-means algorithm.

The steps of classifying user traffic flows into a traffic class and generating user patterns may be performed for the duration of a pre-defined learning period and/or until a pre-defined minimum number of user patterns have been generated, prior to grouping the plurality of users into one or more user groups.

According to a further aspect of the present invention there is provided a method of analysing user traffic flows carried by a communications network, each user traffic flow being associated with one of a plurality of users. The method comprises:

classifying each of a plurality of user traffic flows into one of a plurality of traffic classes, for each user, generating a user pattern comprising the traffic class of each user traffic flow associated with said user;

grouping the plurality of users into one or more user groups based on the user pattern associated with each user;

for each user group, identifying a user whose user pattern is representative of all user patterns within the user group; and for subsequent user traffic flows, analysing only those user traffic flows associated with the representative users, and using the results of the analysis as representative of the user traffic flows associated with all of the plurality of users.

DETAILED DESCRIPTION

In order to overcome, or at least mitigate the problems identified above, there will now be described a method of optimising the classification of user traffic flows. This is achieved by, for each user, determining the classes of traffic that the user is expected to make use of, and then only applying the traffic criteria that are associated with those traffic classes to the information obtained from the user's traffic flows. In doing so, this method accelerates the analysis of the user traffic flows by minimising the processing required to classify the traffic.

According to this method, a traffic classification system performs a conventional traffic classification procedure in order to classify a number of initial user traffic flows, each user traffic flow being associated with a particular user. The information obtained when classifying these initial user traffic flows is then used to generate a user pattern for each user, each user pattern comprising at least the traffic class of each user traffic flow associated with the user. Upon the expiry of a pre-defined learning period and/or once a pre-defined minimum number of user patterns have been generated, the traffic classification system then groups the users into one or more user groups based on the user pattern associated with each user. The traffic classification system then identifies a user pattern within each user group that is representative of all user patterns within the user group. For each subsequent user traffic flow, the traffic classification system identifies the user associated with the subsequent user traffic flow, determines the user group to which the user belongs, and retrieves the representative user pattern of the user group. The traffic classification system then classifies the subsequent user traffic flow using only those traffic classes that are included within the representative user pattern.

Figure 1:
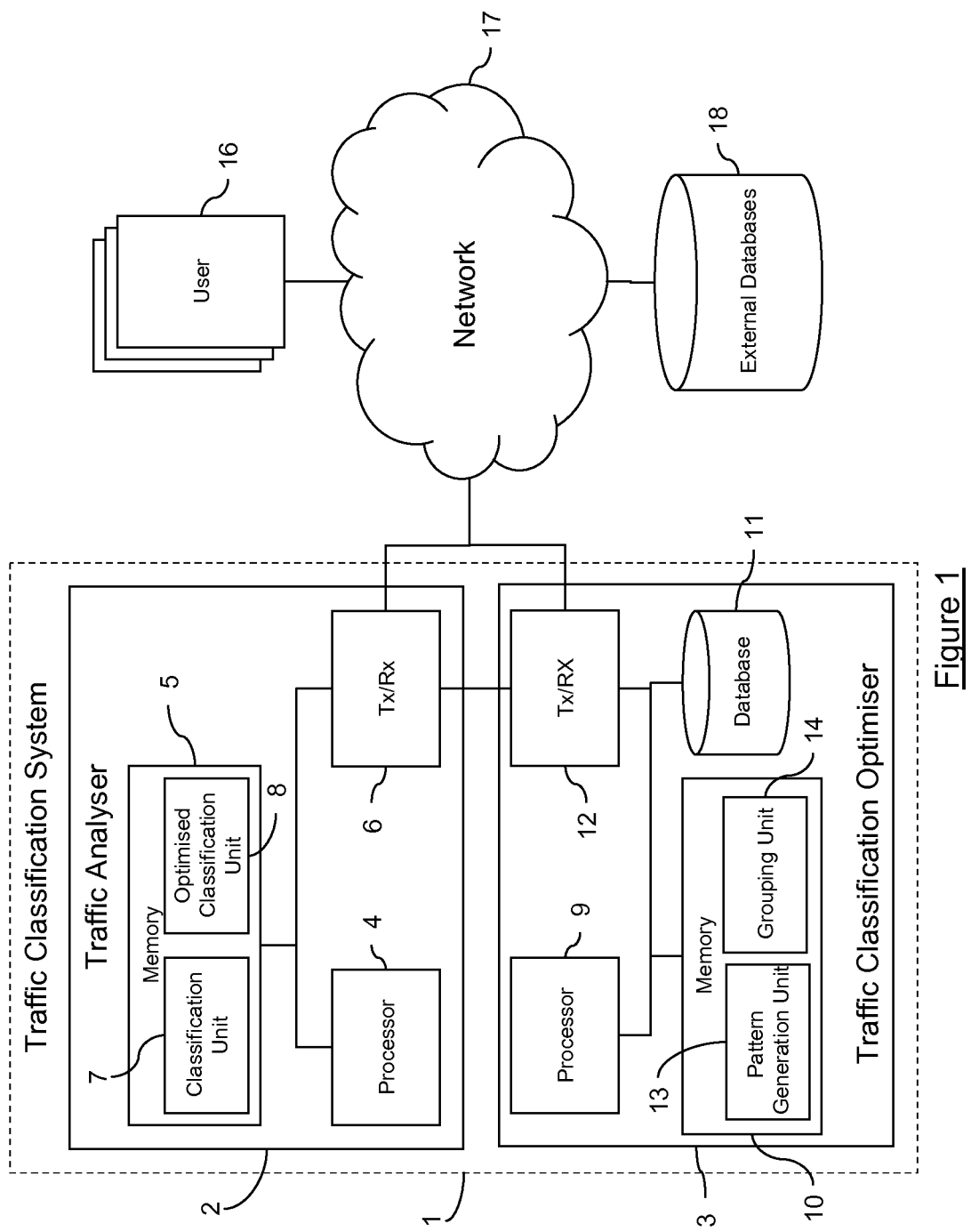
FIG. 1 illustrates schematically an example of a traffic classification system according to an embodiment of the present invention.

FIG. 1 illustrates schematically an example of a traffic classification system 1 suitable for implementing the method. The traffic classification system 1 can be implemented as a combination of computer hardware and software, and comprises a traffic analyser 2 with an interface to a traffic classification optimiser 3. The traffic analyser 2 and the traffic classification optimiser 3 can each be implemented by separate hardware (as illustrated in FIG. 1), such as in separate computers or servers. Alternatively, the traffic analyser 2 and the traffic classification optimiser 3 can be implemented in the same item of hardware (not shown).

The traffic analyser 2 comprises a processor 4, a memory 5, and a transceiver 6. The memory 5 stores the various programmes that are implemented by the processor 4, together with any required data, such as a set of traffic criterion. The programmes include a classification unit 7 and an optimised classification unit 8. The transceiver 6 connects the traffic analyser 2 and to the users 16 via the network 17 and to the traffic classification optimiser 3. The packet analyser 2 is responsible for performing inspection of packets making up the user traffic flows, classifying user traffic flows into the appropriate traffic class based upon the one or more traffic criterion, and providing information relating to the user traffic flows to the traffic classification optimiser 3.

The traffic classification optimiser 3 comprises a processor 9, a memory 10, a database 11, and a transceiver 12. The memory 10 stores the various programmes that are implemented by the processor 9, together with any required data. These programmes include a pattern generation unit 13, and a grouping unit 14. The database 11 is used to store information relating to the user traffic flows and any other relevant information. The transceiver 12 connects the traffic classification optimiser 3 to any external databases 18 via the network 17 and to the traffic analyser 2. The traffic classification optimiser 3 is responsible for generating and maintaining a user pattern/signature for each user, grouping the users according to their user patterns, identifying a user pattern within each group that is representative of all user patterns within the group, providing the traffic analyser 2 with the representative user pattern when required, and maintaining and updating the user groups and representative user patterns with the latest user-related information.

Figure 2:
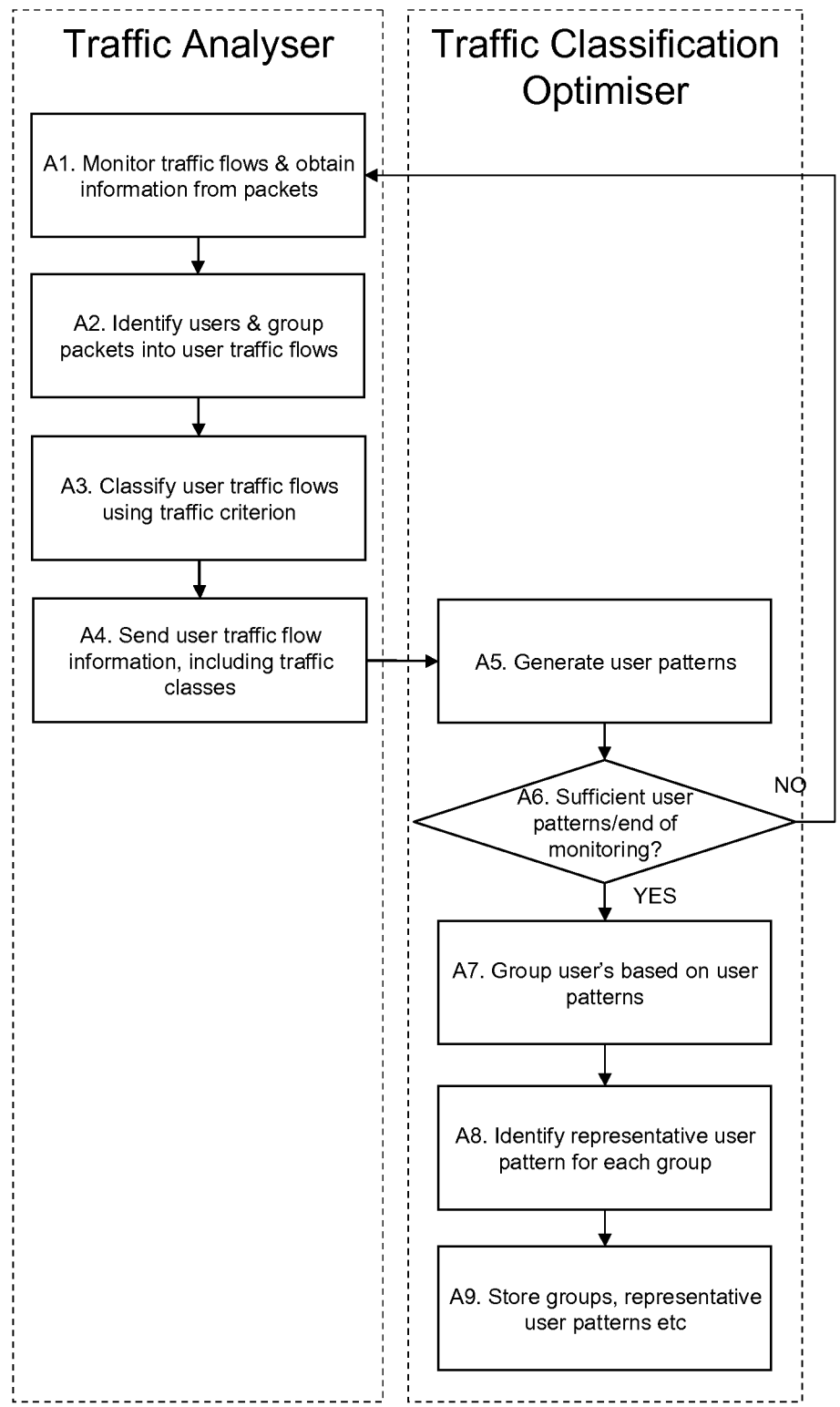
FIG. 2 is a flow diagram illustrating an example of a traffic classification learning procedure according to an embodiment of the present invention.

FIG. 2 is a flow diagram illustrating an example of the procedure implemented by the traffic classification system 1 in order to group the users 16, and to identify a representative user pattern within each group. The steps performed are as follows:

A1. Packet traffic flows carried by the communications network 17 pass through the traffic analyser 2. The traffic analyser 2 performs DPI on the packets to obtain information from both the header of the packets and their payload, that is, information included therein or derivable there from. For example, this information may include:

Quintuplets: source address, destination address, source transport layer address, destination transport layer address, and transport layer protocol;

Packet context: information from headers belonging to application protocols (according to the OSI model); and Charging Data Records (CDRs) and Event Data Records (EDRs).

A2. The traffic analyser 2 then uses the information obtained from the packets to identify the user that each packet relates to, and groups the packets into a number of user traffic flows, each user traffic flow being associated with a particular user.

A3. For each user traffic flow, the traffic analyser 2 applies a set of traffic criteria to the information obtained from the packets within the user traffic flow in order to identify the types or classes of traffic to which the user traffic flow relates. This set of traffic criterion includes one or more traffic criterion for each class of traffic known to the traffic classification system. The traffic criterion associated with a traffic class will be configured such that they can be used to determine if a user traffic flow belongs to that traffic class. To do so, each traffic criterion defines a characteristic of a user traffic flow and a value for that characteristic. For example, a traffic criterion may define that the destination address included within a packet flow must match a specified URL in order to belong to the traffic class associated with that traffic criterion.

A4. The traffic analyser 2 then sends information relating to the user traffic flows to the traffic classification optimiser 3. This user traffic flow information can be sent by the traffic analyser 2 to the traffic classification optimiser 3 either continuously, as this information is obtained, or periodically, with some pre-defined or pre-agreed frequency. Alternatively, the traffic analyser 2 will send the user traffic flow information in response to a request from the traffic classification optimiser 3. The traffic analyser 2 may therefore be required to store or cache the user traffic flow information in its memory 5, at least until the information is sent to the traffic classification optimiser 3.

A5. The traffic classification optimiser 3 receives or retrieves the user traffic flow information from the traffic analyser 2. The traffic classification optimiser 3 then uses the user traffic flow information to build or generate a user pattern for each user, the user pattern describing how the user consumes the services provided over the communications network. As such, the more information that the traffic analyser 2 provides, the greater the accuracy of the user patterns. The traffic classification optimiser 3 stores user patterns in its database 11.

A6. The traffic classification optimiser 3 then determines if it has a sufficient number of user patterns, and/or whether a monitoring/learning period has come to an end. The traffic classification optimiser 3 can determine that it has a sufficient number of user patterns by comparing the number with a threshold. Alternatively, or in addition, the traffic classification optimiser 3 can determine whether or not a monitoring/learning period has come to an end using a timer.

A7. If the traffic classification optimiser 3 determines that it has a sufficient number of user patterns and/or that a learning period has come to an end, then the traffic classification optimiser 3 divides the user patterns into a number of user groups based on the user pattern associated with each user, each user group comprising user's whose user patterns are similar. If not, then the traffic classification optimiser 3 continues generating and updating user patterns using the user traffic flow information received from the traffic analyser 2.

A8. The traffic classification optimiser 3 then identifies a user pattern within each user group that is representative of all user patterns within the user group.

A9. The representative user pattern for each group is then stored in the database 11 of the traffic classification optimiser 3. The traffic classification optimiser 3 can periodically update the representative user pattern using the latest user traffic flow information obtained from the traffic analyser 2, such that the representative user is always chosen to be that which best represents the users belonging to a user group.

The user patterns generated by the traffic classification optimiser 3 may comprise a set of parameters or characteristics that describes how the user consumes the services available over the communications network. The characteristics that may be included within the user patterns can be defined by the operator of the traffic classification system 1.

In addition to the information obtained from the packets within the user packet flows by the traffic analyser 2, the traffic classification optimiser 3 can communicate with other databases 18 to enrich the user patterns. For example, the traffic classification optimiser 3 can retrieve details of URLs visited by a user from different databases and web logs. The traffic classification optimiser 3 can then use this as an additional characteristic within the user patterns. By way of further example, it is quite common for the operator's of telecommunications networks to have a database that returns the terminal type (i.e. smartphone, basic phone, device model etc.) when queried with the International Mobile Equipment Identity (IMEI) of a mobile telecommunications device. The traffic classification optimiser 3 can therefore be configured to communicate with such a database to identify the terminal type used by each user. The terminal type can then be included within the user pattern, and used by the traffic classification optimiser 3 as an additional parameter when dividing the users into user groups. For example, Table 1 illustrates the user patterns of four different users. These exemplary user patterns are made up of five characteristics, including:

bytes of HTTP traffic consumed by the user;
bytes of SMTP traffic consumed by the user;
bytes of Skype traffic consumed by the user;
bytes of BitTorrent traffic consumed by the user; and
the type of terminal used by the user.

To determine the user groups and identify a representative user pattern for each user group, the traffic classification optimiser 3 can make use of some form of clustering analysis, such as a k-means algorithm. In order to implement this clustering analysis of the user patterns, at least some of the parameters making up the user pattern may need to be 'normalised' in some way, such that each user pattern can be represented as a vector or tuple of N dimensions. The nature of this normalisation will depend on the individual parameters and the clustering algorithm to be applied. For example, any parameters that take the form of a string will need to be translated into a numerical value. This can be achieved by performing a look-up in a database or dictionary. For example, Table 2 illustrates a dictionary for assigning numerical values to terminal types. As an alternative to a dictionary look-up, parameters that take the form of a string can be translated into a numerical value using a translation mechanism. For example, if one of the parameters within the user pattern comprises a URL, a hashing algorithm could be applied to the URL in order to generate a numerical value that is representative of that URL.

Once any such parameters of the user patterns have been normalised, a clustering algorithm can be applied to the N-dimensional vectors that represent the user patterns in order to group the user patterns based upon the distance between each of the vectors. There are several distance measures or functions that can be applied by the same clustering algorithm including, among others, the Euclidean distance, the Manhattan distance, and the Hamming distance. Each user pattern is then assigned to a user group/cluster by the clustering algorithm, together with other user patterns that have similar characteristics and are therefore 'nearby'. An identifier for the user is then associated with an identifier for the user group/cluster to which the user's user pattern has been assigned, as illustrated in Table 3.

Figure 3:
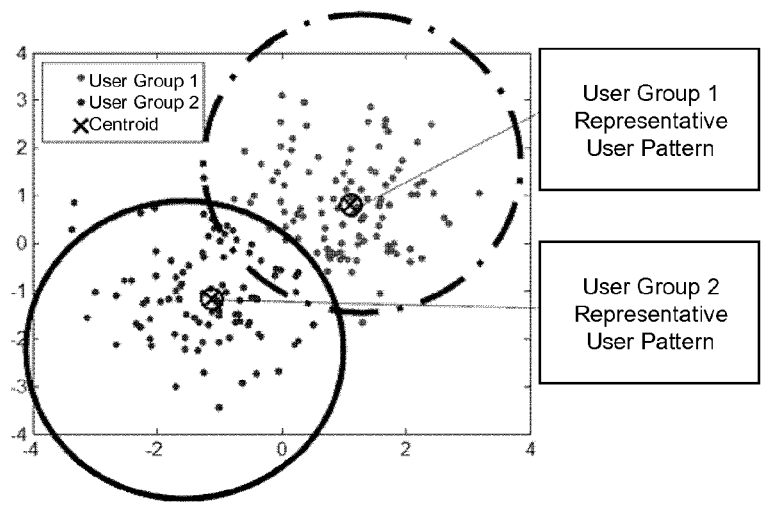
FIG. 3 illustrates a plot showing an example of clustering using a k-means algorithm.

Following the grouping of the users, the representative user pattern for a user group can then be defined as the vector that shares most of its characteristics with the rest of the vectors within that cluster. For example, a k-means algorithm assigns each point of a data set to a cluster whose centre or centroid is nearest to that point. The centroid is therefore the average of all the points in the cluster. The centroid of a user group can therefore be identified as the representative user pattern of that user group. FIG. 3 illustrates a plot showing an example of two clusters and their centroids determined using a k-means algorithm.

Figure 4:
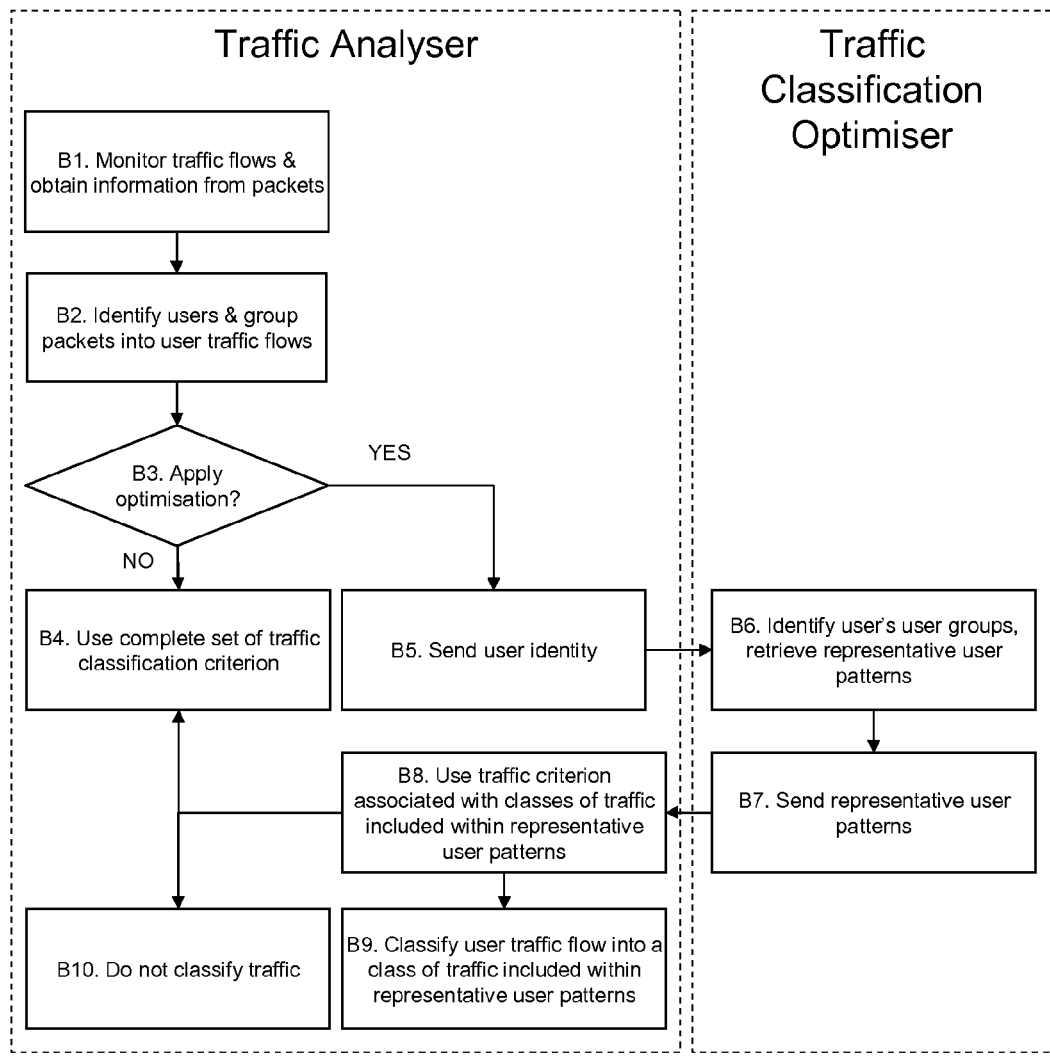
FIG. 4 is a flow diagram illustrating an example of an optimised traffic classification procedure according to an embodiment of the present invention.

FIG. 4 is a flow diagram illustrating an example of the procedure implemented by the traffic classification system 1 in order to enable optimised traffic classification. The steps performed are as follows:

B1. Packet traffic flows carried by the communications network 17 pass through the traffic analyser 2. The traffic analyser 2 performs DPI on the packets to obtain information from both the header of the packets and their payload.

B2. The traffic analyser 2 then uses the information obtained from the packets to identify the user that each packet relates to, and groups the packets into a number of user traffic flows, each user traffic flow being associated with a particular user.

B3. The traffic analyser 2, depending on current operating conditions, determines whether to apply optimised traffic classification or non-optimised/conventional traffic classification. For example, if the traffic analyser 2 is saturated, such that it does not have sufficient resources to perform non-optimised/conventional traffic classification, then the traffic analyser 2 will implement optimised traffic classification.

B4. If the traffic analyser 2 determines that conventional traffic classification should be applied to the user traffic flows, the traffic analyser 2 performs conventional packet classification, applying the traffic criterion associated with all known traffic classes to the information obtained from the packets within the user packet flow.

B5. If the traffic analyser 2 determines that optimised traffic classification should be applied to the user traffic flows, the traffic analyser 2 sends a request to the traffic classification optimiser 3, including the identity of the user, requesting the representative user pattern associated with the identified user, or at the very least, the traffic classes included within the representative user pattern.

B6. The traffic classification optimiser 3 identifies the user group to which the identified user currently belongs, and retrieves the representative user pattern of the identified user group.

B7. The traffic classification optimiser 3 then sends the representative user pattern, or at the very least, the traffic classes included within the representative user pattern, to the traffic analyser 2.

B8. The traffic analyser 2 then applies only those traffic criterion that are associated with the traffic classes included in the representative user pattern to the information obtained from the packets within the user packet flow, in an attempt to identify the class of traffic to which the user traffic flow relates. To do so, the traffic analyser 2 attempts to identify a traffic class, from amongst those traffic classes included in the representative user pattern, for which the value of the characteristic defined in each of the one or more traffic criterion of the traffic class matches the value obtained for that characteristic from the user traffic flow.

B9. If the traffic analyser 2 does identify a traffic class from amongst those traffic classes included in the representative user pattern, then the user traffic flow is classified into this traffic class, and the traffic classification optimiser 3 is notified. The traffic classification optimiser 3 can then update the user pattern and user groups accordingly.

B10. If the traffic analyser 2 can not identify a traffic class from amongst those traffic classes included in the representative user pattern, then the traffic analyser 2 can either leave this user traffic flow unclassified, or can revert back to performing conventional traffic classification for this user traffic flow, in accordance with step B4.

By way of further example, the packets within a traffic flow are identified as being associated with a particular user. That user is then identified as belonging to a particular user group. The representative user pattern of that user group is then identified. In this case, the representative user pattern includes the classes of traffic and the volume of each class of traffic that has previously been consumed by the representative user. As such, the representative user pattern indicates that 50% of the packets related to Skype traffic, 30% of the packets as related to BitTorrent traffic, and the remaining 10% of packets as related to another known application. Having been placed in this user group, the user pattern has previously been identified as being similar to that of the representative user pattern, it can therefore be inferred that it is likely that subsequent traffic flows associated with the user will relate to either Skype traffic, BitTorrent traffic, or to the other known application. Furthermore, it can be inferred that there is a 50% probability that the packets within any subsequent user traffic flow of this user will relate to Skype traffic, a 30% probability that the packets will relate to BitTorrent traffic, and a 10% probability that the packets will be related to other known application. As such, the information obtained from any subsequent user traffic flow is firstly compared with the traffic criterion defined for Skype. If the obtained information does not match the traffic criterion defined for Skype, then the obtained information is compared to the traffic criterion defined for BitTorrent. If the obtained information does not match the traffic criterion defined for either Skype or BitTorrent, then the obtained information is compared to the traffic criterion defined for the other application. Only if the obtained information does not match the traffic criterion defined for any of Skype, BitTorrent or the other application is it then compared with the traffic criteria defined for all the remaining traffic classes.

By attempting to match a user traffic flow against the traffic criteria associated with those classes of traffic included within the representative user pattern, this optimised traffic classification will, in most cases, reduce the amount of processing required in order to identify the class of traffic to which the user traffic flow belongs. Continuing the above example, it can be inferred that there is a 50% probability that the obtained information will only need to be compared against the traffic criterion defined for one application (i.e. Skype), a 30% probability that the obtained information will only need to be compared against the traffic criterion defined for two applications (i.e. Skype and BitTorrent), and a 10% probability that the obtained information will only need to be compared against the traffic criterion defined for three applications (i.e. Skype, BitTorrent and the other application). On average the obtained information will therefore only need to be compared against the traffic criterion defined for 1.4 applications (i.e. $1*0.5+2*0.3+3*0.1=1.4$). As such, for a traffic classification system that has traffic criteria associated with 200 different traffic classes (which is relatively few for the Internet's current protocol diversity), the number of traffic classes whose traffic criterion need to be compared to the obtained information is decreased by a factor of around 140.

Of course, the greater the difference between the information obtained from a user's user traffic flows and the user pattern of the representative user, the lesser the probability that the classes of traffic within the representative user pattern will match the user traffic flow information. For example, a user's traffic usage may mean that they are on, or are close to being on, the border between two user groups. In this case, the traffic classification optimizer 3 could be configured to identify the user as belonging to both user groups, and therefore to provide the traffic analyser 2 with a combination of the representative user patterns from both user groups.

The optimised traffic classification procedure described above can reduce by several orders of magnitude the processing required to classify each new user traffic flow, increasing the efficiency of the traffic classification processing without the need for significant additional hardware or processing resources. In addition, this optimisation can be extended to other uses of packet analysis. For example, if DPI is being implemented to provide usage statistics or the like, and the packet analyser has become congested such that it cannot analyse any further traffic, then the system can switch to an optimised mode, in which only the traffic of the representative user from within each user group is analysed. In doing so, the usage statistics of the representative user can be used as an approximation of the usage of all user's within a user group.

It will be appreciated by the person of skill in the art that various modifications may be made to the above-described embodiments without departing from the scope of the present invention. For example, the traffic classification system can go through a learning or training period in which it builds up a database of user patterns on which to base optimisation, prior to performing any optimisation. The traffic classification system can then begin applying the optimised procedure whilst continual adding user information to the database and updating the user groups and the representative users accordingly. Alternatively, the packet classification system could only periodically make use of additional user traffic flow information to update the user groups and the representative users. As such, the process of grouping the users and the application of the optimised procedure can happen in sequence or in parallel.

TABLE 1

| User ID | HTTP (bytes) | SMTP (bytes) | Skype (bytes) | Bittorrent (bytes) | Terminal Type |
|---------|--------------|--------------|---------------|--------------------|---------------|
| 1214 | 123456 | 23122 | 0 | 212434 | 1 (Nokia N86) |
| 3891 | 219029 | 212676 | 12121256 | 909021 | 2 (Sony-Ericsson X10) |
| 1891 | 10000 | 102122 | 0 | 10001221 | 101 (iPad) |
| 1900 | 1219209 | 120 | 102 | 2819288 | 10 (iPhone) |

TABLE 2

| | |
|---|---|
| Motorola | 1 |
| Ericsson | 2 |
| Nokia | 3 |
| X | Y |

TABLE 3

| User ID | Cluster ID | HTTP (bytes) | SMTP (bytes) | Skype (bytes) | Bittorrent | Terminal Type |
|---------|------------|--------------|--------------|---------------|------------|---------------|
| 1214 | 1 | 123456 | 23122 | 0 | 212434 | 1 (Nokia N68) |
| 3891 | 4 | 219029 | 212676 | 12121256 | 909021 | 2 (Sony-Ericsson X10) |
| 1891 | 1 | 10000 | 102122 | 0 | 10001221 | 101 (iPad) |
| 1900 | 5 | 1219209 | 120 | 102 | 2819288 | 10 (iPhone) |

The invention claimed is:

1. An apparatus configured to classifying user traffic flows carried by a network, each user traffic flow being associated with one of a plurality of users, the apparatus comprising at least one processor and at least one memory, wherein the at least one memory comprises at least one set of instructions executable by the at least one processor, the at least one set of instructions comprising:
   a classification program configured to classify each user traffic flow into one of a plurality of traffic classes;
   a pattern generation program configured to generate a user pattern for each user, each user pattern comprising the traffic class of each user traffic flow associated with said user;

a grouping program configured to use a k-means algorithm as a clustering algorithm to group the plurality of users into one or more user groups based on the user pattern associated with each user, and to identify a user pattern within each user group that is representative of all user patterns within the user group, wherein the representative user pattern of a user group is identified as a centroid of the user group, as determined by the k-means algorithm; and an optimized classification program configured to identify a user associated with a subsequent user traffic flow, determining the user group to which the user belongs, retrieving the representative user pattern of said user group, and using the traffic classes included in the representative user pattern to classify the subsequent user traffic flow.

2. An apparatus as claimed in claim 1, the at least one memory storing one or more traffic criterion for each of the plurality of traffic classes, the one or more traffic criterion of a traffic class being configured to determine if a user traffic flow belongs to said traffic class, each traffic criterion defining a characteristic of a user traffic flow and a value for said characteristic.

3. An apparatus as claimed in claim 2, the classification program being configured to:
 obtain, from each user traffic flow, a value for the characteristic defined by each of the one or more traffic criterion of the plurality of traffic classes;
 determine a traffic class for which the value of the characteristic defined in each of the one or more traffic criterion of said traffic class matches the obtained value for said characteristic; and
 classify the user traffic flow into said traffic class.

4. An apparatus as claimed in claim 2, the optimized classification program being configured to:
 obtain, from the subsequent user traffic flow, a value for the characteristic defined by each of the one or more traffic criterion of those traffic classes included in the representative user pattern;
 attempt to identify a traffic class, from amongst those traffic classes included in the representative user pattern, for which the value of the characteristic defined in each of the one or more traffic criterion of said traffic class matches the obtained value for said characteristic; and
 if a traffic class is identified, classify the subsequent user traffic flow into said traffic class, and update the user pattern of the user accordingly.

5. An apparatus as claimed in claim 4, wherein, if a traffic class cannot be identified from amongst those traffic classes included in the representative user pattern, then the optimized classification program is further configured to not classify the subsequent user traffic flow.

6. An apparatus as claimed in claim 4, wherein, if a traffic class cannot be identified from amongst those traffic classes included in the representative user pattern, then the optimized classification program is further configured to:
 obtain, from each user traffic flow, a value for the characteristic defined by each of the one or more traffic criterion of the plurality of traffic classes;
 determine a traffic class for which the value of the characteristic defined in each of the one or more traffic criterion of said traffic class matches the obtained value for said characteristic; and
 classify the user traffic flow into said traffic class.

7. An apparatus as claimed in claim 1, the pattern generation program being configured to generate a user pattern for each user that further comprise additional user-related information.

8. An apparatus as claimed in claim 7, and further comprising a transceiver for obtaining the additional user-related information from one or more entities within or attached to the network.

9. An apparatus as claimed in claim 1, the grouping program being configured to group the plurality of users into one or more user groups once a pre-defined learning period has expired and/or once a pre-defined minimum number of user patterns have been generated by the pattern generation program.

10. A method of classifying user traffic flows carried by a network, each user traffic flow being associated with one of a plurality of users, the method comprising:
 classifying each user traffic flow into one of a plurality of traffic classes;
 for each user, generating a user pattern comprising the traffic class of each user traffic flow associated with said user;
 grouping, through use of a k-means algorithm as a clustering algorithm, the plurality of users into one or more user groups based on the user pattern associated with each user;
 for each user group, identifying a user pattern that is representative of all user patterns within the user group, wherein the representative user pattern of a user group is identified as a centroid of the user group, as determined by the k-means algorithm; and
 for each subsequent user traffic flow, identifying a user associated with the subsequent user traffic flow, determining the user group to which the user belongs, retrieving the representative user pattern of said user group, and using the traffic classes included in the representative user pattern to classify the subsequent user traffic flow.

11. A method as claimed in claim 10, and further comprising:
 for each traffic class, configuring one or more traffic criterion to be used to determine if a user traffic flow belongs to said traffic class, each traffic criterion defining a characteristic of a user traffic flow and a value for said characteristic.

12. A method as claimed in claim 11, wherein the step of classifying each user traffic flow into one of a plurality of traffic classes comprises:
 obtaining, from each user traffic flow, a value for the characteristic defined by each of the one or more traffic criterion of the plurality of traffic classes;
 determining a traffic class for which the value of the characteristic defined in each of the one or more traffic criterion of said traffic class matches the obtained value for said characteristic; and
 classifying the user traffic flow into said traffic class.

13. A method as claimed in claim 11, wherein the step of using the traffic classes included in the representative user pattern to classify the subsequent user traffic flow comprises:
 obtaining, from the subsequent user traffic flow, a value for the characteristic defined by each of the one or more traffic criterion of the traffic classes included in the representative user pattern;
 attempting to identify a traffic class, from amongst those traffic classes included in the representative user pattern, for which the value of the characteristic defined in each of the one or more traffic criterion of said traffic class matches the obtained value for said characteristic; and if a traffic class is identified, classifying the subsequent user traffic flow into said traffic class, and update the user pattern of the user accordingly.

14. A method as claimed in claim 13, wherein, if a traffic class cannot be identified from amongst those traffic classes included in the representative user pattern, then the subsequent user traffic flow is not classified.

15. A method as claimed in claim 13, wherein, if a traffic class cannot be identified from amongst those traffic classes included in the representative user pattern, then the method further comprises:
  - obtaining, from each user traffic flow, a value for the characteristic defined by each of the one or more traffic criterion of the plurality of traffic classes;
  - determining a traffic class for which the value of the characteristic defined in each of the one or more traffic criterion of said traffic class matches the obtained value for said characteristic; and
  - classifying the user traffic flow into said traffic class.

16. A method as claimed in claim 10, wherein the user pattern generated for each user further comprises additional user-related information.

17. A method as claimed in claim 16, wherein the step of generating a user pattern for each user further comprises:
  - obtaining the additional user-related information from one or more entities within or attached to the network.

18. A method as claimed in claim 10, wherein the steps of classifying user traffic flows into a traffic class and generating user patterns are performed for the duration of a pre-defined learning period and/or until a pre-defined minimum number of user patterns have been generated, prior to grouping the plurality of users into one or more user groups.

19. An apparatus as claimed in claim 1, wherein the clustering algorithm uses one or more of Manhattan distance function and Hamming distance function.

20. A method as claimed in claim 10, wherein the clustering algorithm uses one or more of Manhattan distance function and Hamming distance function.

* * * * *